United States Patent
Johansson et al.

(10) Patent No.: US 9,572,145 B2
(45) Date of Patent: Feb. 14, 2017

(54) PDCCH RESOURCE UTILIZATION

(71) Applicant: TELEFONAKTIEBOLAGET L M ERICSSON (PUBL), Stockholm (SE)

(72) Inventors: Anders Johansson, Hässelby (SE); Jawad Manssour, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 778 days.

(21) Appl. No.: 13/818,404

(22) PCT Filed: Dec. 11, 2012

(86) PCT No.: PCT/EP2012/075096
§ 371 (c)(1),
(2) Date: Feb. 22, 2013

(87) PCT Pub. No.: WO2014/090287
PCT Pub. Date: Jun. 19, 2014

(65) Prior Publication Data
US 2014/0204836 A1    Jul. 24, 2014

(51) Int. Cl.
*H04W 72/04* (2009.01)
*H04W 72/08* (2009.01)

(52) U.S. Cl.
CPC ......... *H04W 72/042* (2013.01); *H04W 72/085* (2013.01)

(58) Field of Classification Search
CPC .................................................. H04W 72/042
USPC ........................................................ 370/328
See application file for complete search history.

(56) References Cited

U.S. PATENT DOCUMENTS

| 2010/0195583 | A1* | 8/2010 | Nory et al. | 370/329 |
|---|---|---|---|---|
| 2011/0211538 | A1* | 9/2011 | Kakura | 370/329 |
| 2011/0228732 | A1* | 9/2011 | Luo et al. | 370/329 |
| 2011/0310856 | A1* | 12/2011 | Hariharan | H04L 1/1607 370/336 |
| 2012/0051270 | A1* | 3/2012 | Chen et al. | 370/279 |
| 2012/0057529 | A1* | 3/2012 | Seo et al. | 370/328 |

(Continued)

OTHER PUBLICATIONS

Samsung. Remaining DMRS Aspects for EPDCCH. 3GPP Draft; R1-124382 DMRS Aspects. Sep. 29, 2012.
(Continued)

*Primary Examiner* — Anh-Vu Ly
*Assistant Examiner* — Abdullahi Ahmed
(74) *Attorney, Agent, or Firm* — Patent Portfolio Builders, PLLC

(57) ABSTRACT

The present disclosure provides coordination of assignments for the physical downlink control channel (PDCCH) in a multi-sector cell based on reuse of CCE resources to user equipment (UE) in different sectors that are well isolated from each other. For non-isolated UEs the CCE resources are either repeated in all sectors for better reception performance, or transmitted in one sector while the corresponding CCEs in the other sectors are reserved. In order to achieve coordinated PDCCH assignment there is provided methods for coordinated PDCCH transmission, a system comprising transmission points which are associated with a common physical cell identity and which are controlled by a common network node. There is also provided a corresponding network node and computer readable media comprising computer program code.

27 Claims, 8 Drawing Sheets

(56) References Cited

U.S. PATENT DOCUMENTS

| | | | |
|---|---|---|---|
| 2012/0176884 A1* | 7/2012 | Zhang et al. | 370/203 |
| 2013/0083753 A1* | 4/2013 | Lee | H04W 72/0453 370/329 |
| 2013/0272213 A1* | 10/2013 | Manssour | 370/329 |
| 2014/0254519 A1* | 9/2014 | Horiuchi et al. | 370/329 |
| 2015/0023263 A1* | 1/2015 | Son et al. | 370/329 |
| 2015/0055599 A1* | 2/2015 | Qu et al. | 370/329 |

OTHER PUBLICATIONS

Research in Motion, et al. PDCCH Enhancement Considerations. 3GPP Draft; R1-111661 (RIM—PDCCH Enhancement Considerations). May 3, 2011.

Samsung. Discussion on Downlink Control Channel Enhancement. 3GPP Draft; R1-111471. May 3, 2011.

Ericsson, et al. Resource Element Mapping for Support of CoMP Transmission. 3GPP Draft; R1-124535. Sep. 29, 2012.

E-PDCCH Resource Management. 3GPP Draft; R1-112284. Aug. 17, 2011.

3GPP TS 36.211 V10.6.0; 3rd Generation Partnership Project; Technical Specification Group Radio Access Network; Evolved Universal Terrestrial Radio Access (E-UTRA); Physical Channels and Modulation (Release 10); Dec. 2012.

3GPP TS 36.212 V11.1.0; 3rd Generation Partnership Project; Technical Specification Group Radio Access Network; Evolved Universal Terrestrial Radio Access (E-UTRA); Multiplexing and channel coding (Release 11); Dec. 2012.

3GPP TS 36.213 V11.1.0; 3rd Generation Partnership Project; Technical Specification Group Radio Access Network; Evolved Universal Terrestrial Radio Access (E-UTRA); Physical layer procedures (Release 11); Dec. 2012.

* cited by examiner

PDCCH RESOURCE UTILIZATION

TECHNICAL FIELD

Embodiments presented herein relate to resource utilization in mobile communication networks, and particularly to resource utilization of the physical downlink control channel in mobile communication networks.

BACKGROUND

In mobile communication networks, there is always a challenge to obtain good performance and capacity for a given communications protocol, its parameters and the physical environment in which the mobile communication network is deployed.

One performance and capacity parameter of the communication network relates to utilization of orthogonal time/frequency resources (inter alia Orthogonal Frequency Division Multiplexing (OFDM) in the downlink (DL) and Single Carrier Frequency Division Multiple Access (SCFDMA) in the uplink (UL)). Certain utilization of the orthogonal time/frequency resources may allow scheduling multiple user equipment (UE), at the same time over the operating bandwidth without creating any intra-cell interference (particularly when assuming that spatial multiplexing is not used).

In order to schedule UEs, whether in DL or in UL, the UEs should be informed on which frequency resources they are expected to transmit/receive data, which Modulation and Coding Scheme (MCS) to use, etc.

In mobile communication networks based on the Long Term Evolution (LTE) telecommunications standard this may be accomplished by means of the physical downlink control channel (PDCCH). In LTE the PDCCH is typically broadcasted every millisecond over the first one, two or three OFDM symbols (out of the 14 OFDM symbols transmitted every millisecond, assuming a normal cyclic prefix). The PDCCH assignments to the UE are encapsulated into control channel elements (CCE) whose purpose is mainly to simplify the search for the UE on the PDCCH.

The PDCCH is transmitted in the control region, typically the first one, two or three symbols of a subframe, using 1, 2, 4 or 8 CCEs. The number of CCEs selected for a PDCCH depends on the Downlink Control Information (DCI) format and coding rate, i.e. the link adaptation for PDCCH. Each CCEs consists of 36 Resource Elements (RE). The size of CCE-space is between 1 and 88 CCEs depending on bandwidth, number of antenna ports, Control Format Indicator (CFI), physical hybrid automatic repeat request indicator channel (PHICH) resources size, cyclic prefix size and Time Division Duplex/Frequency Division Duplex (TDD/FDD) configuration.

PDCCH is a resource shared by both UL and DL UEs. As a consequence thereof the PDCCH needs to be large enough (i.e. occupy enough bandwidth and/or other resources) to schedule a plurality of UEs in every Transmission Time Interval (TTI) in case of a plurality of simultaneously active UEs. At the same time, a larger PDCCH results in a smaller physical downlink shared channel (PDSCH), which in turn thus implies fewer resources to be available for transmission of the actual payload data in the DL. This may thus further imply losses in both peak throughput and cell capacity to be caused.

One concept in particular that requires efficient usage of PDCCH is the "shared cell" concept. In all simplicity, the shared cell concept refers to configuring two adjacent cells with the same Physical Cell Identity (PCI). One of the main advantages of this concept is avoiding handover between the adjacent cells sharing the same PCI as these cells will appear to one single cell for the UE.

From the above, it can be understood that an efficient resource utilization of the PDCCH is desirable in order to allow scheduling of as many UEs as desired without sacrificing throughput or capacity. Also, one issue relating to practical implementation of the "shared cell" concept is how the PDCCH should be utilized as this latter could become a limiting resource.

Hence, there is still a need for an improved resource utilization of the PDCCH.

SUMMARY

An object of embodiments herein is to provide improved resource utilization of the PDCCH.

The inventors of the enclosed embodiments have through a combination of practical experimentation and theoretical derivation discovered that in shared cell deployments, the physical downlink control channel (PDCCH) can easily become a bottleneck. A proper handling of PDCCH in a shared cell deployment is therefore of benefit in deployments as it is desirable to provide a high capacity for the PDCCH (i.e. have enough UL grants for scheduling uplink users and DL assignments for scheduling downlink users) without compromising the performance for cell-edge users especially as these users are expected to reap the benefits of a shared cell deployment.

A particular object is therefore to provide efficient PDCCH utilization when shared cells are utilized, without requiring specific UE support.

According to a first aspect there is presented method of coordinated physical downlink control channel, PDCCH, transmission. The method comprises transmitting, by a first transmission point, first PDCCH control information at a control channel element, CCE, index to a first user equipment, wherein the first PDCCH control information is specific for the first user equipment. The method comprises transmitting, by a second transmission point, second PDCCH control information also at the CCE index to a second user equipment, wherein the second PDCCH control information is specific for the second user equipment. The first transmission point and the second transmission point are associated with a common physical cell identity, PCI, and are controlled by a common network node.

According to a second aspect there is presented a method of coordinated physical downlink control channel, PDCCH, transmission. The method comprises transmitting, by a first transmission point, first PDCCH control information at a first control channel element, CCE, index to a first user equipment and being muted at a second CCE index, wherein the first PDCCH control information is specific for the first user equipment. The method comprises transmitting, by a second transmission point, second PDCCH control information at the second CCE index to a second user equipment and being muted at the first CCE index, wherein the second PDCCH control information is specific for the second user equipment. The method comprises transmitting, by a third transmission point, the first PDCCH control information at the first CCE index to the first user equipment. The method comprises transmitting, by the third transmission point, the second PDCCH control information at the second CCE index to the second user equipment. The first transmission point, the second transmission point, and the third transmission point are associated with a common physical cell identity, PCI, and are controlled by a common network node.

According to a third aspect there is presented a method for coordinated physical downlink control channel, PDCCH, transmission. The method comprises providing a first transmission point with instructions to transmit first PDCCH control information at a control channel element, CCE, index to a first user equipment, wherein the first PDCCH control information is specific for the first user equipment. The method comprises providing a second transmission point with instructions to transmit second PDCCH control information also at the CCE index to a second user equipment, wherein the second PDCCH control information is specific for the second user equipment. The first transmission point and the second transmission point are associated with a common physical cell identity, PCI, and are controlled by a common network node.

According to a fourth aspect there is presented method for coordinated physical downlink control channel, PDCCH, transmission. The method comprises providing a first transmission point with instructions to transmit first PDCCH control information at a first control channel element, CCE, index to a first user equipment and to be muted at a second CCE index, wherein the first PDCCH control information is specific for the first user equipment. The method comprises providing a second transmission point with instructions to transmit second PDCCH control information at a second CCE index to a second user equipment and to be muted at the first CCE index, wherein the second PDCCH control information is specific for the second user equipment. The method comprises providing a third transmission point with instructions to transmit the first PDCCH control information at the first CCE index to the first user equipment. The method comprises providing the third transmission point with instructions to transmit the second PDCCH control information at the second CCE index to the second user equipment. The first transmission point, the second transmission point, and the third transmission point are associated with a common physical cell identity, PCI, and are controlled by a common network node.

According to a fifth aspect there is presented a system for coordinated physical downlink control channel, PDCCH, transmission, the system comprising a first transmission point and a second transmission point, wherein the first transmission point and the second transmission point are associated with a common physical cell identity, PCI, and are controlled by a common network node. The first transmission point is arranged to transmit first PDCCH control information at a control channel element, CCE, index to a first user equipment, wherein the first PDCCH control information is specific for the first user equipment. The second transmission point is arranged to transmit second PDCCH control information also at the CCE index to a second user equipment, wherein the second PDCCH control information is specific for the second user equipment.

According to a sixth aspect there is presented a system for coordinated physical downlink control channel, PDCCH, transmission, the system comprising a first transmission point, a second transmission point, and a third transmission point, wherein the first transmission point, the second transmission point, and the third transmission point are associated with a common physical cell identity, PCI, and are controlled by a common network node. The first transmission point is arranged to transmit first PDCCH control information at a first control channel element, CCE, index to a first user equipment and to be muted at a second CCE index, wherein the first PDCCH control information is specific for the first user equipment. The second transmission point is arranged to transmit second PDCCH control information at the second CCE index to a second user equipment and to be muted at the first CCE index, wherein the second PDCCH control information is specific for the second user equipment. The third transmission point is arranged to transmit the first PDCCH control information at the first CCE index to the first user equipment. The third transmission point is arranged to transmit the second PDCCH control information at the second CCE index to the second user equipment.

According to a seventh aspect there is presented a network node for coordinated physical downlink control channel, PDCCH, transmission. The network node comprises a communications interface. The communications interface is arranged to provide a first transmission point with instructions to transmit first PDCCH control information at a control channel element, CCE, index to a first user equipment, wherein the first PDCCH control information is specific for the first user equipment. The communications interface is arranged to provide a second transmission point with instructions to transmit second PDCCH control information also at the CCE index to a second user equipment, wherein the second PDCCH control information is specific for the second user equipment. The first transmission point and the second transmission point are associated with a common physical cell identity, PCI, and are controlled by a common network node.

According to an eight aspect there is presented a network node for coordinated physical downlink control channel, PDCCH, transmission. The network node comprises a communications interface. The communications interface is arranged to provide a first transmission point with instructions to transmit first PDCCH control information at a first control channel element, CCE, index to a first user equipment and to be muted at a second CCE index, wherein the first PDCCH control information is specific for the first user equipment. The communications interface is arranged to provide a second transmission point with instructions to transmit second PDCCH control information at a second CCE index to a second user equipment and to be muted at the first CCE index, wherein the second PDCCH control information is specific for the second user equipment. The communications interface is arranged to provide a third transmission point with instructions to transmit the first PDCCH control information at the first CCE index to the first user equipment. The communications interface is arranged to provide the third transmission point with instructions to transmit the second PDCCH control information at the second CCE index to the second user equipment. The first transmission point, the second transmission point, and the third transmission point are associated with a common physical cell identity, PCI, and are controlled by a common network node.

Advantageously this enables the interference on the PDCCH to be decreased and the tolerated reuse level for the PDCCH to be increased. In other words, advantageously this results in a higher PDCCH capacity.

Advantageously the disclosed subject matter is directly applicable for legacy UEs since there is no specific UE-support required.

According to a ninth aspect there is presented a computer program for coordinated physical downlink control channel, PDCCH, transmission, the computer program comprising computer program code which, when run on a run on a first transmission point and a second transmission point, causes the first transmission point and the second transmission point to perform a method according to the first aspect.

According to a tenth aspect there is presented a computer program for coordinated physical downlink control channel, PDCCH, transmission, the computer program comprising computer program code which, when run on a first transmission point, a second transmission point and a third transmission point, causes the first transmission point, the second transmission point and the third transmission point to perform a method according to the second aspect.

According to a eleventh aspect there is presented a computer program for coordinated physical downlink control channel, PDCCH, transmission, the computer program comprising computer program code which, when run on a network node, causes the network node to perform a method according to the third aspect.

According to a twelfth aspect there is presented a computer program for coordinated physical downlink control channel, PDCCH, transmission, the computer program comprising computer program code which, when run on a network node, causes the network node to perform a method according to the fourth aspect.

According to a thirteenth aspect there is presented a computer program product comprising a computer program according to at least one of the ninth, tenth, eleventh and twelfth aspect and a computer readable means on which the computer program is stored.

It is to be noted that any feature of the first, second, third, fourth, fifth, sixth, seventh, eighth, ninth, tenth, eleventh, twelfth, and/or thirteenth aspect may be applied to any other aspect, wherever appropriate. Likewise, any advantage of the first aspect may equally apply to the second, third, fourth, fifth, sixth, seventh, eighth, ninth, tenth, eleventh, twelfth, and/or thirteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure is now described, by way of example, with reference to the accompanying drawings, in which.

DETAILED DESCRIPTION

The present disclosure will now be described more fully hereinafter with reference to the accompanying drawings, in which certain embodiments of the disclosure are shown. This disclosure may, however, be embodied in many different forms and should not be construed as limited to the embodiments set forth herein; rather, these embodiments are provided by way of example so that this disclosure will be thorough and complete, and will fully convey the scope of the disclosure to those skilled in the art. Like numbers refer to like elements throughout the description.

Figure 1:
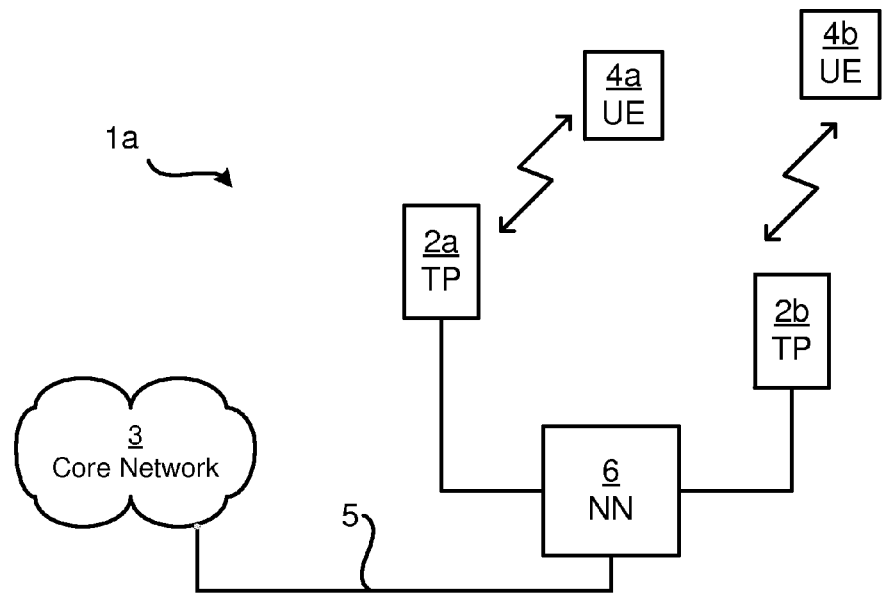
FIGS. 1-3 are schematic diagrams illustrating mobile communication networks where embodiments presented herein may be applied.
Figure 2:
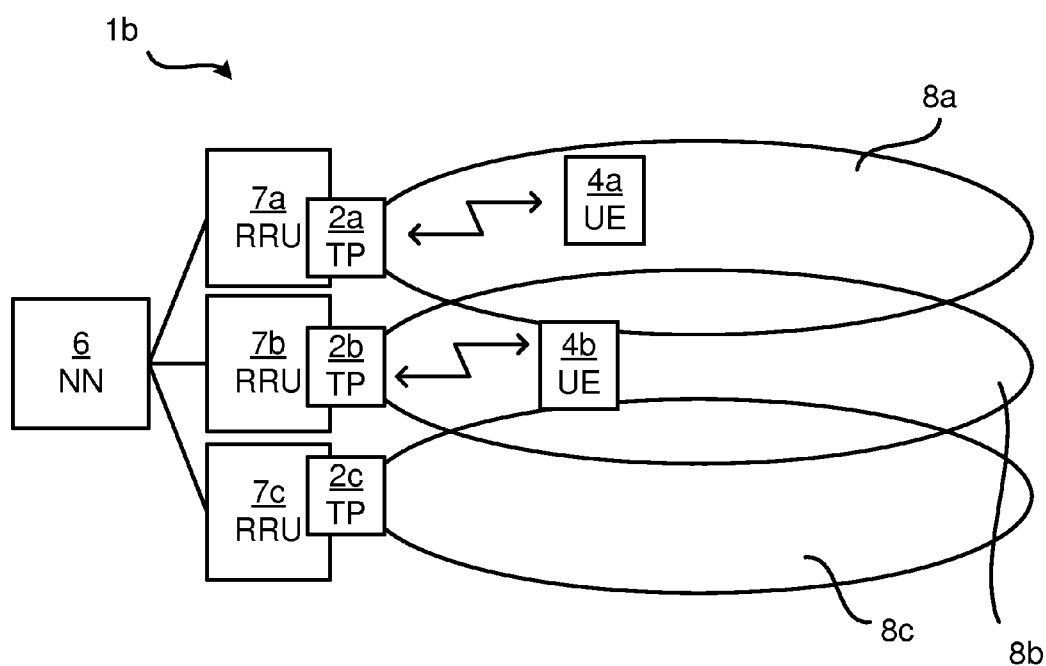
Figure 3:
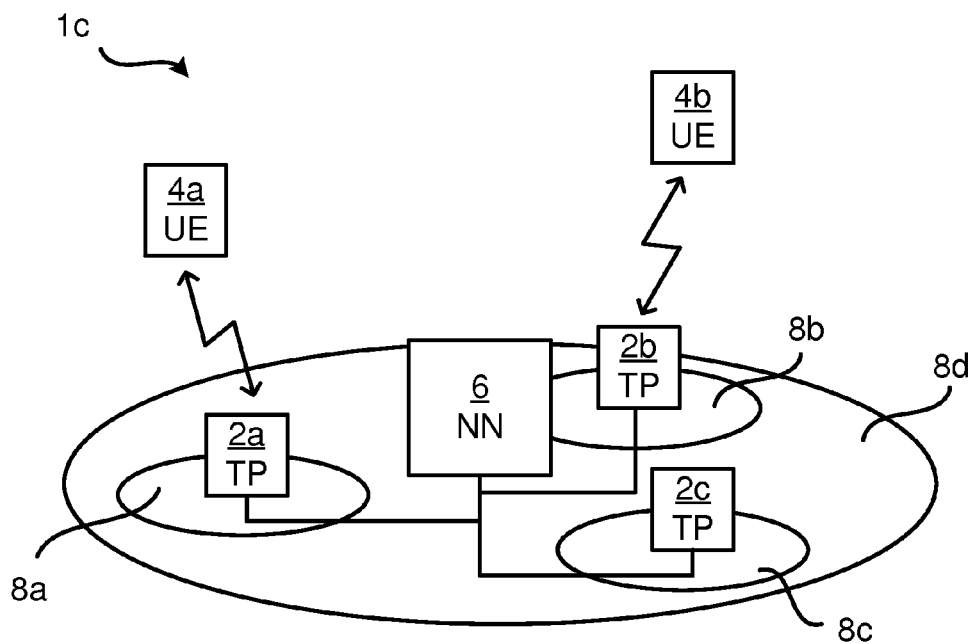

FIGS. 1, 2 and 3 are schematic diagrams illustrating mobile communication networks 1a, 1b, and 1c, respectively, where embodiments presented herein can be applied. The mobile communications network 1a of FIG. 1 comprises a core network 3. The core network 3 offers telecommunications services to the user equipment (UE) 4a, 4b. In general term the UE 4a, 4b may be a mobile terminal, a user terminal, a user agent, a mobile phone, etc. In order for the UE 4a, 4b to access the telecommunications services offered by the core network 3, the UE 4a, 4b are arranged to communicate with a transmission point (TP) 2a, 2b and/or a network node (NN) 6. The transmission point 2a, 2b are operatively connected to the network node 6 which in turn is operatively connected to the core network 3 as schematically illustrated at reference 5. Although not illustrated in FIG. 1, there may in addition be one or more other (types of) network nodes in between the core network 3 and the network node 6. One such example is where the network node is a NodeB and wherein a radio network controller (RNC) consequently is located between the NodeB and the network node 6. Similarly, in some embodiments there may be another (type of) network node between the network node 6 and the UE 4a, 4b. One such example is where the network node 6 is an RNC and wherein a NodeB consequently is located between the RNC and the UE 4a, 4b. As is understood, the mobile communication system 1a may generally comprise a plurality of network nodes 6, a plurality of transmission points 2a, 2b and a plurality of UE 4a, 4b.

The mobile communications network 1b of FIG. 2 is similar to the mobile communications network 1a of FIG. 1. In comparison, the mobile communications network 1b additionally comprises remote radio units (RRU) 7a, 7b, 7c to each of which a corresponding transmission point 2a, 2b, 2c is operatively coupled. Each transmission point 2a, 2b, 2c may be part of one RRU 7a, 7b, 7c which in turn is coupled to the network node 6. Alternatively, according to embodiments one of the first transmission point 2a and the second transmission point 2b is located at the network node 6. In FIG. 2 also the coverage areas 8a, 8b, 8c, of each transmission point 2a, 2b, 2c is illustrated.

The mobile communications network 1c of FIG. 3 is similar to the mobile communications network 1a of FIG. 1 and the communications network 1b of FIG. 2. In addition, according to the mobile communications network 1c of FIG. 3 the network node 6 is associated with a coverage area 8d. The mobile communications networks 1b, 1c of FIGS. 2 and 3 may be regarded as "shared cell" schemes, or Coordinated Multi Point (CoMP) transmission/reception schemes where the network node 6 acts as a coordinating network node and where the transmission points 2a, 2b, 2c act as cooperating network nodes. In such schemes the coverage areas 8a, 8b, 8c of the transmission points 2a, 2b, 2c may be regarded as pico cells or micro cells, whereas the coverage area 8d of the network node 6 may be regarded as a macro cell.

In general terms, one transmission point may correspond to one antenna port set, i.e., one set of antennas at a network node (as in FIGS. 1 and 3) or one set of antennas at an RRU (as in FIG. 2).

Figure 4:
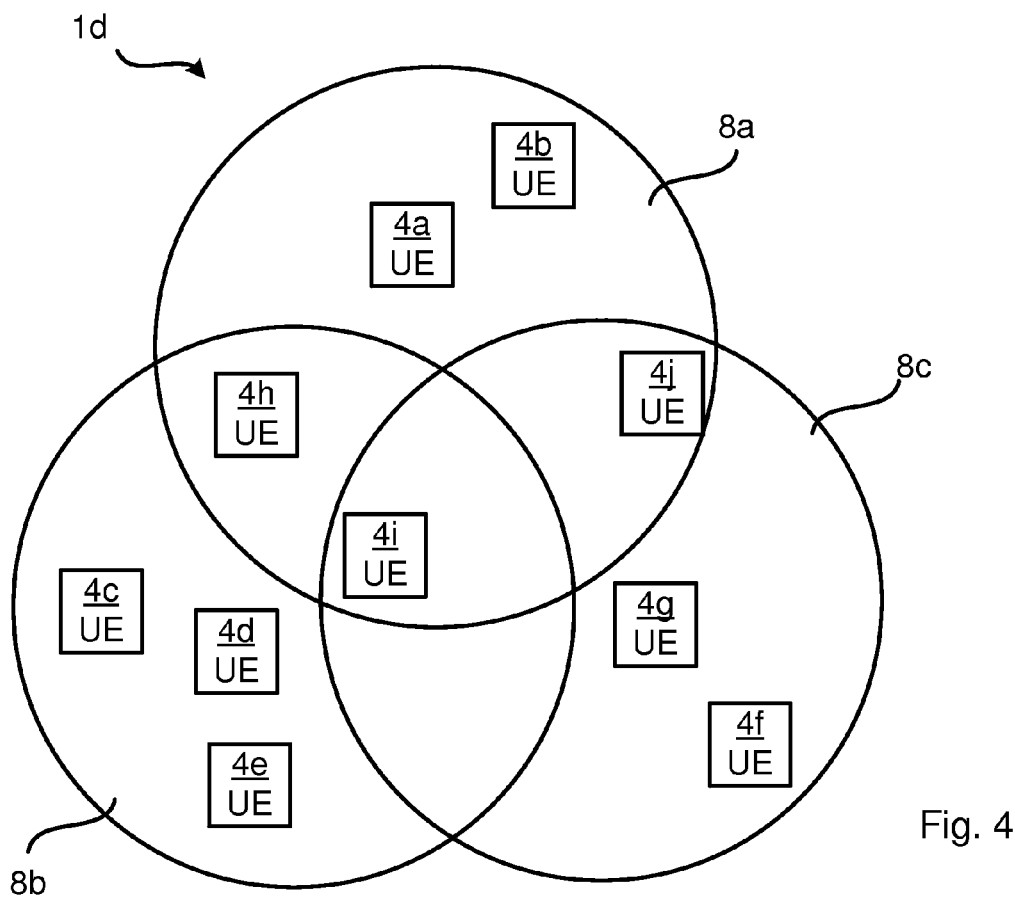
FIG. 4 is a schematic diagram of a network topology of a mobile communications network according to any one of FIGS. 1-3.

FIG. 4 schematically illustrates a network topology 1d of a mobile communications network, such as the mobile communications network 1a of FIG. 1, the mobile communications network 1b of FIG. 2, and/or the mobile communications network 1c of FIG. 3. The network topology 1d comprises coverage areas 8a, 8b, 8c, each of which is associated with a transmission point 2a, 2b, 2c and/or a network node 6. FIG. 4 also illustrates locations of UE 4a-4j in the network topology 1d.

The mobile communication systems of FIGS. 1-3 may generally comply with any one or a combination of W-CDMA (Wideband Code Division Multiple Access), LTE (Long Term Evolution), EDGE (Enhanced Data Rates for GSM Evolution, GPRS (General Packet Radio Service)), CDMA2000 (Code Division Multiple Access 2000), WiMAX (Worldwide Interoperability for Microwave Access), etc., as long as the principles described hereinafter are applicable. According to embodiments the mobile communication systems of FIGS. 1-3 are compliant with the Evolved Universal Terrestrial Radio Access Network (E-UTRAN). Typically the E-UTRAN consists only of network nodes 6 in the form of eNodeBs (E-UTRAN NodeB, also known as Evolved NodeB) on the network side. The network node 6 may according to embodiments alternatively be a traditional NodeB which typically has minimum functionality, and is controlled by an RNC (Radio Network Controller). NodeB is a term used in UMTS (Universal Mobile Telecommunications System) equivalent to the BTS (base transceiver station) description used in the Global System for Mobile Communications (GSM). Furthermore, the network node 6 may according to embodiments alternatively be an RNC. eNodeBs are typically connected to each other via the so-called X2 interface, and they connect to the core network 3 via the so-called S1 interface.

The embodiments disclosed herein relate to efficient utilization of the LTE Physical Downlink Control Channel (PDCCH) when shared cells (i.e. cells with same Physical Cell Identity, PCI) are used. In order to obtain efficient utilization of the PDCCH there is provided a network node 6 and a system comprising either at least a first transmission point 2a and a second transmission point 2b or at least a first transmission point 2a, a second transmission point 2b and a third transmission point 2c, methods performed in the network node 6 and in the system, computer programs 22a, 22b, 22c comprising code, for example in the form of a computer program product 21, that when run on at least one of the network node 6, the first transmission point 2a, the second transmission point 2b and the third transmission point 2c, causes the at least one of the network node 6, the first transmission point 2a, the second transmission point 2b and the third transmission point 2c to perform the methods.

The present disclosure provides coordination of PDCCH assignments in a shared cell (in FIGS. 2-4 represented by coverage cells 8a-c) by reusing the same CCE resources to UEs 4a-j in different sectors 8a-c that are well isolated from each other, whilst for non-isolated UEs 4a-j the CCE resources are either repeated in all sectors 8a-c for better reception performance, or transmitted in one sector 8a-c whilst the corresponding CCEs in the other sectors 8a-c are reserved (i.e. not used at all). The terms sector and cell will be used interchangeably. In other words, UE-specific PDCCH resources may be allocated in those sectors where the UE 4a-j is "present", and the corresponding CCEs in the remaining sectors may be reused for grants/assignments to other UEs 4a-j. The term "present" will be further defined below. UEs 4a-j that share the same CCE resources in different sectors 8a-d may be carefully chosen based on a specific criterion as explained in more details below.

Figure 5:
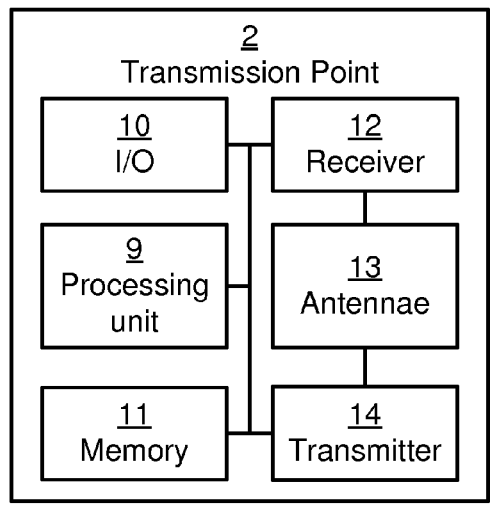
FIG. 5 is a schematic diagram showing functional modules of a transmission point.

FIG. 5 schematically illustrates, in terms of a number of functional modules, the components of a transmission point 2. The transmission point 2 takes the role of the first transmission point 2a, the second transmission point 2b and the third transmission point 2c. A processing unit 9 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 21 (as in FIG. 7), e.g. in the form of a memory 11. Thus the processing unit 9 is thereby arranged to execute methods as herein disclosed. The memory 11 may also comprise persistent storage, which, for example, can be any single one or combination of magnetic memory, optical memory, solid state memory or even remotely mounted memory. The transmission point 2 may further comprise an input/output (I/O) interface to for receiving and providing information to a network node 6. The transmission point 2 also comprises one or more transmitters 14 and receivers 12, comprising analogue and digital components and a suitable number of antennae 13 for radio communication with a UE 4a, 4b. The processing unit 9 controls the general operation of the transmission point 2, e.g. by sending control signals to the I/O interface to, the transmitter 14 and/or the receiver 12 and receiving reports from the I/O interface to, transmitter 14 and/or receiver 12 of its operation. Other components, as well as the related functionality, of the transmission point 2 are omitted in order not to obscure the concepts presented herein.

Figure 6:
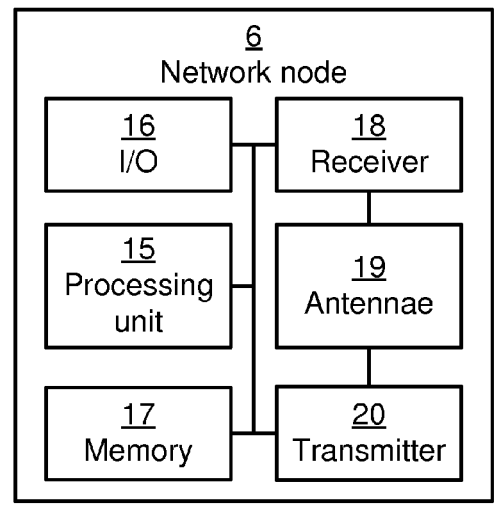
FIG. 6 is a schematic diagram showing functional modules of a network node.

FIG. 6 schematically illustrates, in terms of a number of functional modules, the components of a network node 6. A processing unit 15 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 21 (as in FIG. 7), e.g. in the form of a memory 17. Thus the processing unit 15 is thereby arranged to execute methods as herein disclosed. The memory 17 may also comprise persistent storage, which, for example, can be any single one or combination of magnetic memory, optical memory, solid state memory or even remotely mounted memory. The network node 6 may further comprise an input/output (I/O) interface 16 for receiving and providing information to a transmission point 2, a remote radio unit (RRU) 7a, 7b, 7c and/or a core network 3. The network node 6 may also comprise one or more transmitters 20 and receivers 18, comprising analogue and digital components and a suitable number of antennae 19 for radio communication with a UE 4a, 4b. The processing unit 15 controls the general operation of the network node 6, e.g. by sending control signals to the I/O interface 16, the transmitter 20 and/or the receiver 18 and receiving reports from the I/O interface 16, transmitter 20 and/or receiver 18 of its operation. Other components, as well as the related functionality, of the network node 6 are omitted in order not to obscure the concepts presented herein.

Figure 7:
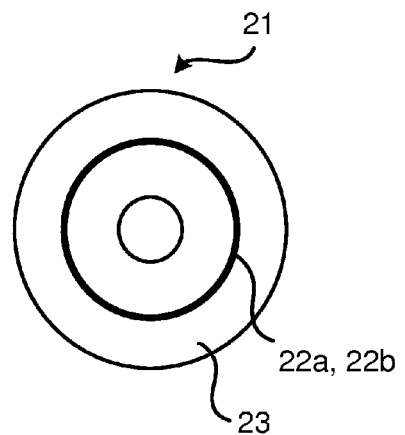
FIG. 7 shows one example of a computer program product comprising computer readable means.

FIGS. 9, 10, 11, 12, 13, 14, 15 and 16 are flow charts illustrating embodiments of methods of coordinated physical downlink control channel, PDCCH, transmission. The methods are performed in at least one of the network node 6, the first transmission point 2a, the second transmission point 2b and the third transmission point 2c. The methods are advantageously provided as computer programs 22a, 22b, 22c, 22d. FIG. 7 shows one example of a computer program product 21 comprising computer readable means 23. On this computer readable means 23, at least one computer program 22a-d can be stored, which at least one computer program 22a-d can cause the processing unit 9, 15 and thereto operatively coupled entities and devices to execute methods according to embodiments described herein. In the example of FIG. 7, the computer program product 21 is illustrated as an optical disc, such as a CD (compact disc) or a DVD (digital versatile disc) or a Blu-Ray disc. The computer program product 21 could also be embodied as a memory 11, 17, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 22a-d is here schematically shown as a track on the depicted optical disk, the computer program 22a-d can be stored in any way which is suitable for the computer program product 21.

Figure 8:
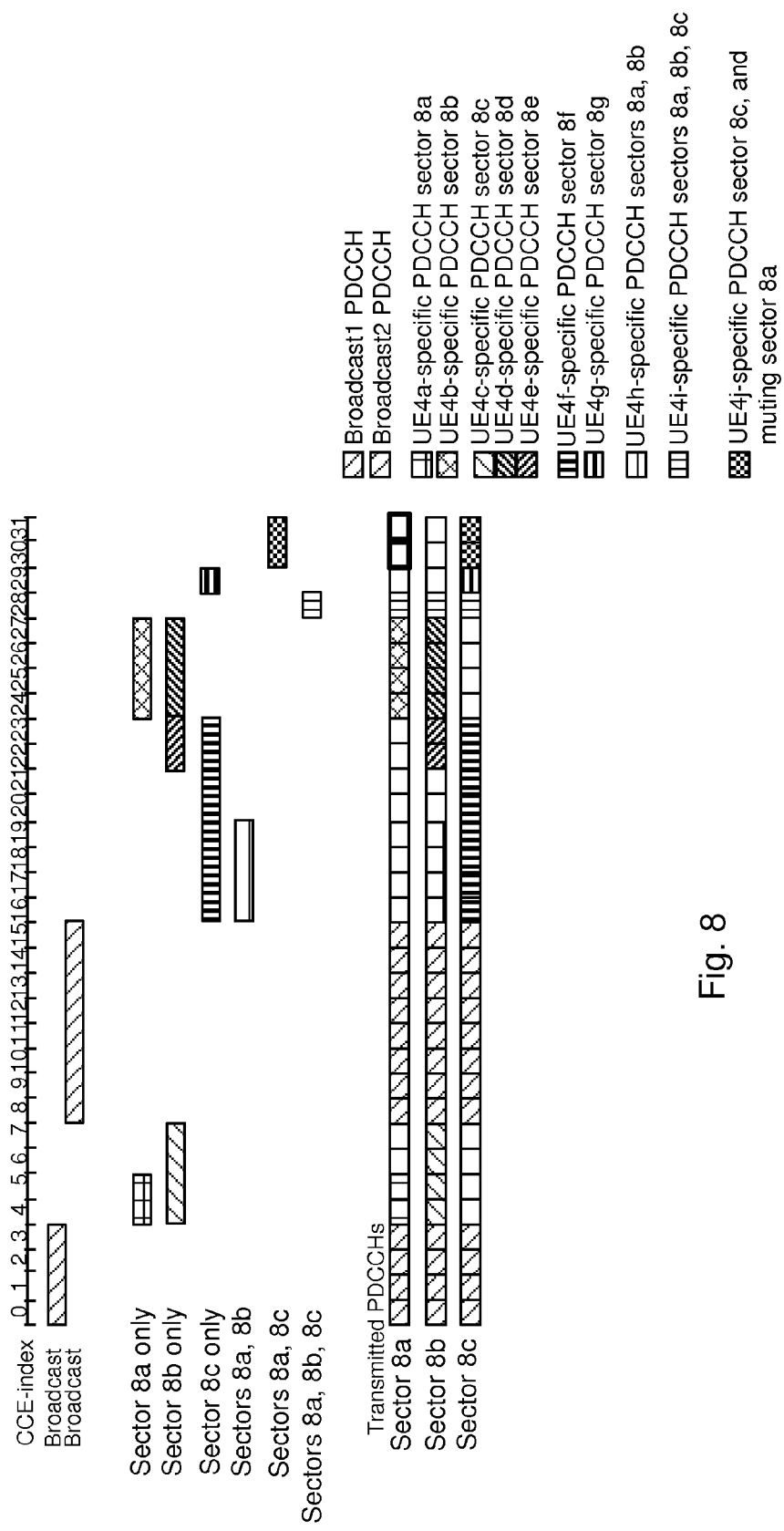
FIG. 8 shows one example of PDCCH allocation.
Figure 9:
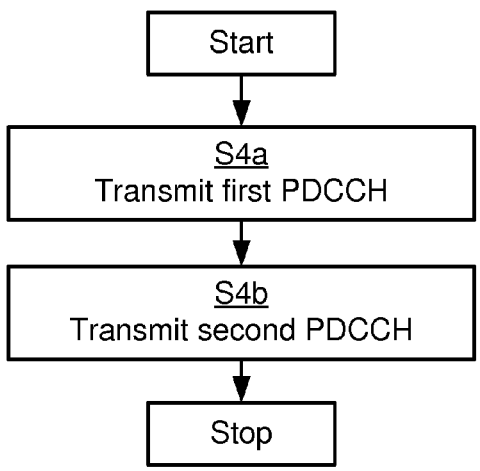
FIGS. 9-16 are flowcharts of methods according to embodiments.
Figure 10:
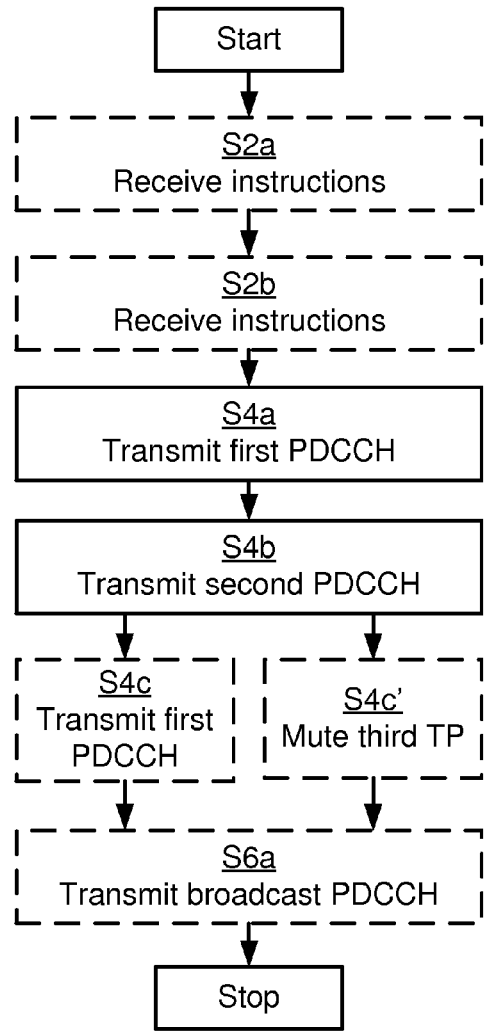
Figure 11:
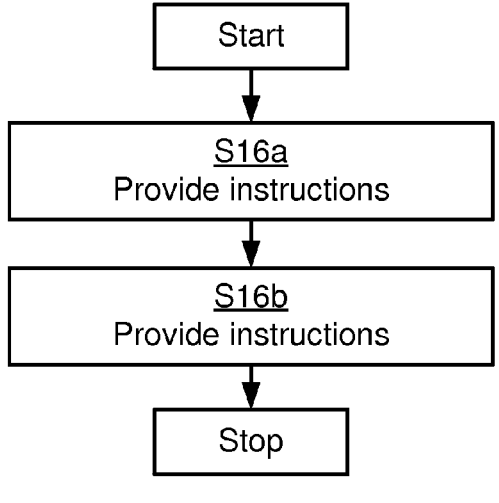
Figure 12:
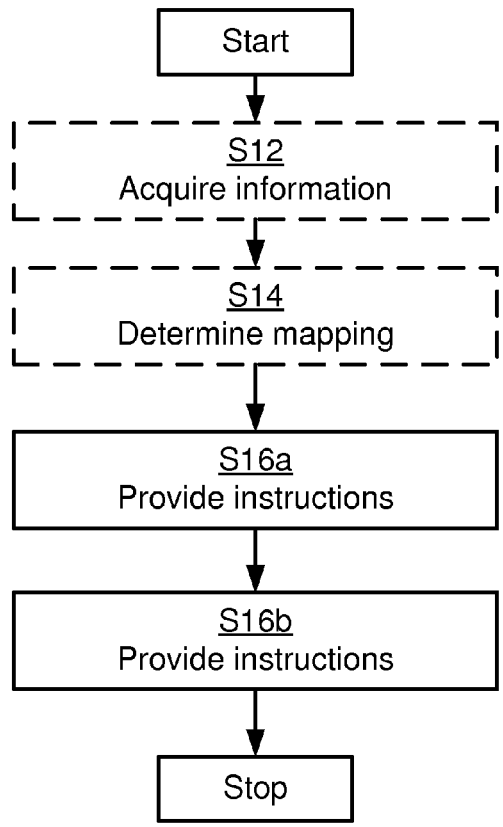
Figure 13:
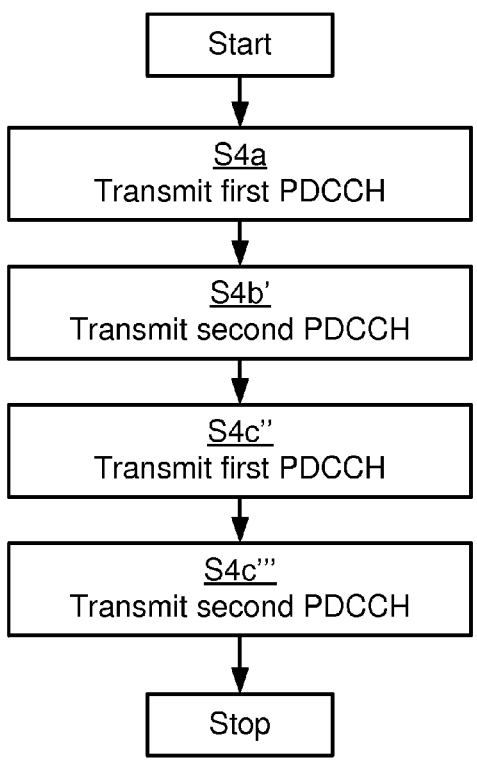
Figure 14:
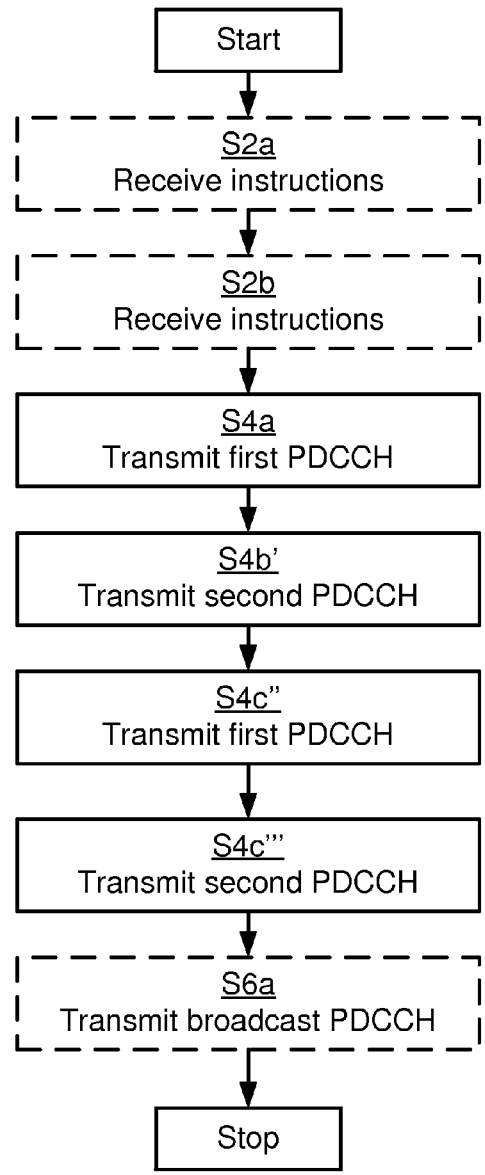
Figure 15:
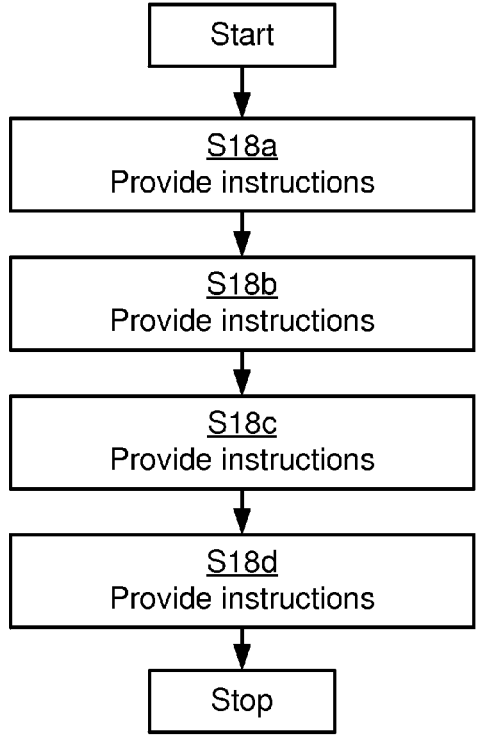
Figure 16:
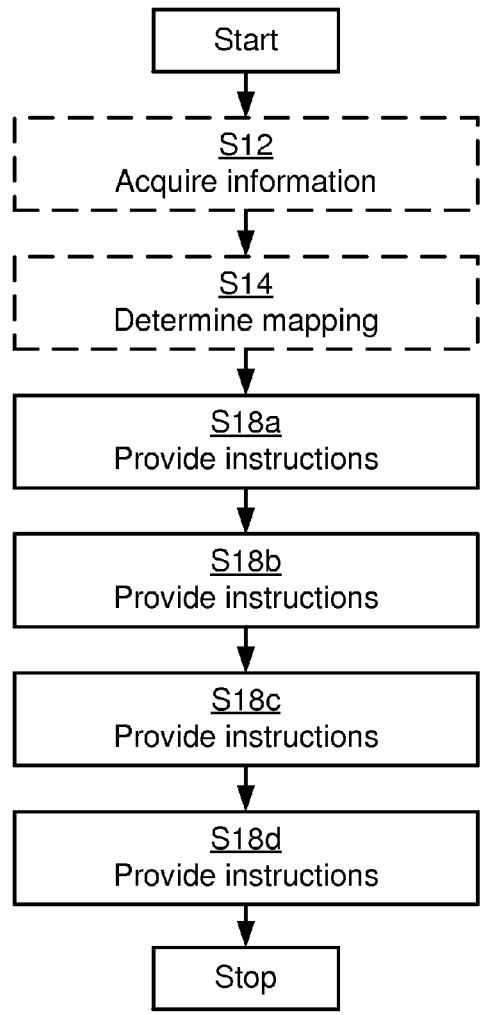

Returning now to FIG. 4, embodiments of the disclosure will be illustrated by means of example with reference to three sectors using the same PCI. FIG. 8 schematically illustrates an example of the disclosed CCE reuse scheme for such a scenario. One characteristic of the "shared cell" concept, henceforth also referred to as sectors or layers, is that since all participating cells in the "shared cell" share the same PCI they will commonly map CCEs with the same index to the same time-frequency Resource Elements (RE).

In such a scenario, the following types of users could exist. In general terms, the term "present" may be defined by an association between UEs and TPs where reception power (at the TP and/or the UE) is above an upper threshold. The term "not present" may be defined by the reception power (at TP and/or UE) being below a lower threshold. It is readily understood that different sectors may have different thresholds and that UL detection might defer from DL detection resulting in separate "UL presence" and "DL presence". A more precise definition of the terms "present" and "not present" will be provided below.

UEs that are "present" in only one sector (i.e. either in sector 8a, 8b or 8c; UE 4a and UE 4b are "present" in sector 8a, UE 4c, UE 4d and UE 4e are "present" in sector 8b, and UE 4f and UE 4g are "present" in sector 8c), UEs that are "present" in two sectors (i.e. either sectors 8a and 8b, sectors 8a and 8c, or sectors 8b and 8c; UE 4h is "present" in sectors 8a and 8b, UE 4j is "present" in sectors 8a and 8c), or UEs that are "present" in all sectors (i.e. sectors 8a, 8b and 8c; UE 4i is present in sectors 8a, 8b and 8c)

For instance, UEs that are present in only one sector may be allocated CCEs only in this one sector. The corresponding CCE resources (i.e. using the same CCE index) in the other two sectors can then be assigned to other UEs, i.e. to UEs present in one or two sectors. A method of coordinated physical downlink control channel, PDCCH, transmission, comprises transmitting, in a step S4a, by a first transmission point 2a, first PDCCH control information at a control channel element, CCE, index to a first user equipment, wherein the first PDCCH control information is specific for the first user equipment. The method further comprises transmitting, in a step S4b, by a second transmission point 2b, second PDCCH control information also at the CCE index to a second user equipment 4b, wherein the second PDCCH control information is specific for the second user equipment. The first transmission point 2a and the second transmission point 2b are associated with a common physical cell identity, PCI, and are controlled by a common network node 6.

As noted above the terms "present" and "not present" are associated with the reception power at the transmission point and/or the UE. More precisely, according to embodiments reception power of messages UL received by the first transmission point 2a from the first user equipment and/or reception power of DL messages received by the first UE from the first transmission point is above a first upper threshold; the first UE is thus present in the sector associated with the first transmission point 2a. According to embodiments reception power of UL messages received by the second transmission point 2b from the second UE and/or reception power of DL messages received by the second UE from the second transmission point 2a is above a second upper threshold; the second UE is thus present in the sector associated with the second transmission point 2b. According to embodiments reception power of UL messages received by the first transmission point 2a from the second UE and/or reception power of DL messages received by the second UE from the first transmission point 2a is below a first lower threshold being lower than the first upper threshold; the second UE is thus not present in the sector associated with the first transmission point 2a. According to embodiments reception power of UL messages received by the second transmission point 2b from the first UE and/or reception power of DL messages received by the first UE from the second transmission point 2b is below a second lower threshold being lower than the second upper threshold; the first UE is thus not present in the sector associated with the second transmission point 2b.

Referring to FIGS. 4 and 8, this is exemplified by e.g. UE 4a and UE 4b that are "present" only in sector 8a. The UE-specific PDCCHs for UE 4a and UE 4b are therefore only transmitted in sector 8a (by transmission point 2a) and in sectors 8b and 8c it is possible (for the transmission points 2b and 2c) to reuse the corresponding CCEs for other PDCCHs. Reusing these CCE resources will ensure a higher PDCCH capacity for the shared cell deployment whilst guaranteeing that these resources will be used by a UE that would not be disturbed by the PDCCH transmission from sector 8a since these resources will be allocated to UEs that are present in sector 8b and/or sector 8c, but not present in sector 8a.

The network node 6 may be arranged to, in a step S12, acquire information from each one of the transmission points 2a, 2b, 2c relating to a number of user equipment associated therewith. The network node 6 may then be arranged to, in a step S14 determine, based on the acquired information, a mapping from a set of PDCCHs to CCE indices, wherein the number of PDCCHs corresponds to the number of unique UEs. The network node 6 is thereby arranged to assign one PDCCH to each user equipment. As will be further disclosed below, the determining is according to embodiments further based on an order of priority of the UEs. The network node 6 is further arranged to, in a step S16a, provide the first transmission point 2a with instructions to transmit the first PDCCH control information. The network node 6 is further arranged to, in a step S16*b*, provide the second transmission point 2*b* with instructions to transmit the second PDCCH control information. The instructions transmitted in steps S16*a* and S16*b* may be based on the mapping determined in step S14. The first transmission point 2*a* may thus be arranged to, in a step S2*a*, prior to transmitting the first PDCCH control information in step S4*a*, receive the instructions from the network node 6 to transmit the first PDCCH control information. Likewise, the second transmission point 2*b* may thus be arranged to, in a step S2*b*, prior to transmitting the second PDCCH control information in step S4*b*, receive the instructions from the network node 6 to transmit the second PDCCH control information.

In general terms, the above disclosed steps may be repeated for a plurality of transmission points and UEs. In particular, a third transmission point 2*c* may be arranged to, in a step S4*c*, transmit the first PDCCH control information at the CCE index to the UE. The first transmission point 2*a* and the third transmission point 2*c* are associated with the common PCI and are controlled by the common network node 6. Further, the reception power of messages received by the third transmission point 2*c* from the first UE is above a third upper threshold. In a similar way the PDCCHs for UE 4*c*, UE 4*d* and UE 4*e* are thus sector-specific for sector 8*b*, and the PDCCHs for UE 4*f* and UE 4*g* are sector-specific for sector 8*c*.

For UEs that are present in all sectors (for example UE 4*i* in FIG. 4), CCEs may be allocated in all sectors. Alternatively, it may be possible to mute one or several of the sectors and block the muted CCEs so that they will not be used by other UEs. According to an embodiment the method of coordinated physical downlink control channel, PDCCH, transmission therefore comprises in a step S4*c*' muting a third transmission point 2*c* at the CCE index. The first transmission point 2*a* and the third transmission point 2*c* are associated with the common PCI and are controlled by said common network node 6. The criterion to mute one or more CCE instead of using them could be based inter alia on a trade-off between the generated interference from transmission from transmission points of all sectors (to cells outside the cluster) and the expected PDCCH signal to interference plus noise ratio (SINR) of the UE in question (e.g. if the UE is able to achieve a high enough PDCCH SINR whilst muting a transmission point in one of the sectors).

The processing of UEs that are present in two sectors may be seen as a hybrid between how the two other types of UEs (i.e. UEs present in one sector and UEs present in all sectors) are processed. For instance, UE 4*h* is assumed to be present in both sectors 8*a* and 8*b* whilst being well isolated from sector 8*c*. In a case it has been determined to transmit the UE-specific PDCCH for UE 4*h* by the transmission point 2*a* in sector 8*a* as well as by the transmission point 2*b* in sector 8*b*, the corresponding CCEs in sector 8*c* may be used for other purposes.

In a similar way, UE 4*j* is assumed to be present in both sector 8*a* and sector 8*c*. In contrast to the case of UE 4*h* it may for UE 4*j* be determined to transmit the UE-specific PDCCH only by the transmission point 2*c* in sector 8*c* and muting the transmission point 2*a* in sectors 8*a* at the corresponding CCEs. This could be done inter alia to reduce the interference caused by the transmission by transmission point 2*a* in sector 8*a* to a neighbouring cell. The corresponding CCEs in Sector 8*b* may still be used for other purposes.

For broadcast messages, such as Broadcast 1 and Broadcast 2 in FIG. 8, which are required to be received by all UEs are typically transmitted by transmission points in all sectors. According to an embodiment the method of coordinated physical downlink control channel, PDCCH, transmission therefore comprises in a step S6*a* transmitting, by the first transmission point 2*a*, broadcast PDCCH control information at a further control channel element, CCE, index to the first user equipment and to the second user equipment.

In addition to the same PCI requirement the prerequisite for a "shared cell" concept may be that the sectors or layers use the same system bandwidth, number of antennas, cyclic prefix length, number of control symbols (CFI) and/or PHICH resource size (Ng). According to one embodiment all these parameters are the same for the participating sectors (as defined by the transmission points 2*a*, 2*b*, 2*c* responsible for transmission/reception to/from the UEs 4*a-j*).

If different sectors in a shared cell use the same parameters, such as any of the same system bandwidth, number of antennas, cyclic prefix length, PHICH resource size (Ng) and/or number of control symbols (CFI), this enables the UEs 4*a-j* to utilize the transmitted power from several sectors without any extra processing, so called over-the-air combining, when receiving both PDSCH and PDCCH. Furthermore, keeping some or all of the above parameters equal in different sectors simplifies the sector configurations for the network operator. This enables the network operator to use an out-of-box configuration for the sectors in the shared cell. No special implementations in the network nodes 6 (eNodeB) are required, e.g. bookkeeping to keep track of colliding resource elements in different sectors or handling of PDCCH to PDSCH intra-cell interference. In 3GPP Release 11 more support for different parameter settings for different sectors is expected to be included.

According to an embodiment, at least the system bandwidth, number of antennas, cyclic prefix length and PHICH resource size are kept fixed in the mobile communications network 1*a*, 1*b*, 1*c*. According to an embodiment the CFI is equal in different sectors of a shared cell in order to avoid interference between PDSCH and PDCCH; otherwise a corresponding restriction may be imposed. In general terms it may also be required that the sectors are time aligned.

It has been assumed that the PDCCHs are reused in case two transmission points are isolated. However, in a case there is a macro cell comprising a number of pico cell, there might be several scenarios where two UEs are present in the macro cell and where each UE at the same time is present in one pico cell. From a PDCCH capacity point of view, it could in such a scenario be of benefit to mute the CCEs in the macro cell and reuse these CCEs in both pico cells.

A method of coordinated physical downlink control channel, PDCCH, transmission, comprises transmitting, in a step S4*a* and by a first transmission point 2*a*, first PDCCH control information at a first control channel element, CCE, index to a first UE whilst being muted at a second CCE index, wherein said first PDCCH control information is specific for the first user equipment. This method of coordinated physical downlink control channel, PDCCH, transmission, further comprises transmitting, in a step S4*b*' and by a second transmission point 2*b*, second PDCCH control information at the second CCE index to a second user equipment whilst being muted at the first CCE index, wherein the second PDCCH control information is specific for the second user equipment. This method of coordinated physical downlink control channel, PDCCH, transmission, further comprises transmitting, in a step S4*c*" and by a third transmission point 2*c*, the first PDCCH control information at the first CCE index to the first user equipment. This method of coordinated physical downlink control channel, PDCCH, transmission, further comprises transmitting, in a step S4c''' and by the third transmission point 2c, the second PDCCH control information at the second CCE index to the second user equipment 4b. The first transmission point 2a, the second transmission point 2b, and the third transmission point 2c are associated with a common physical cell identity, PCI, and are controlled by a common network node 6. According to embodiments the first transmission point 2a and the second transmission point 2b are transmission points of respective pico cells whereas the third transmission point 2c is a transmission point of a macro cell.

As noted above, the network node 6 may be arranged to, in a step S12, acquire information from each one of the transmission points 2a, 2b, 2c relating to a number of user equipment associated therewith. The network node 6 may then be arranged to, in a step S14 determine, based on the acquired information, a mapping from a set of PDCCHs to CCE indices, wherein the number of PDCCHs corresponds to the number of unique UEs. The network node 6 is thereby arranged to assign one PDCCH to each user equipment. The network node 6 is further arranged to, in a step S18a, provide the first transmission point 2a with instructions to transmit the first PDCCH control information and to be muted at the second CCE index. The network node 6 is further arranged to, in a step S18b, provide the second transmission point 2b with instructions to transmit the second PDCCH control information and to be muted at the first CCE index. The network node 6 is further arranged to, in a step S18c, provide the third transmission point 2c with instructions to transmit the first PDCCH control information. The network node 6 is further arranged to, in a step S18d, provide the third transmission point 2c with instructions to transmit the second PDCCH control information.

Thereby the first UE is arranged to receive the first PDCCH control information at the first CCE index from the transmitting point of the pico cell in which the first UE is present as well as from the transmitting point of the macro cell in which the first UE is present. In the same way the second UE is arranged to receive the second PDCCH control information at the second CCE index from the transmitting point of the pico cell in which the second UE is present as well as from the transmitting point of the macro cell in which the second UE is present. The first UE and the second UE are present in different pico cells but may be present in the same macro cell.

For example, the first UE may receive the first PDCCH control information on CCEs with index 9 to 16 whereas the second UE may receive the second PDCCH control information on CCEs with index 1 to 8. This would mean that the first transmission point is muted on CCEs 1 to 8 whilst the second transmission point is muted on CCEs 9 to 16. The third transmission point is arranged to transmit on all CCEs.

PDCCH Assignment Scheme

The CCE-spaces for the different sectors can be populated in a number of different ways depending on the objectives of the PDCCH assignments. One typical PDCCH assignment scheme will be disclosed below. However, as the skilled person understands, the present disclosure is not limited to any particular PDCCH assignment scheme and thus further PDCCH assignment schemes are also possible within the present disclosure.

In general terms, the PDCCH assignment scheme may be based on ordering the UEs according to a priority criterion.

According to a first example, UEs that are present in the least number of sectors are prioritized. That is, according to an embodiment the order of priority is based on the number of transmission points associated with each UE, and UEs associated with the least number of transmission points are prioritized. Thereby the maximum total number of PDCCH assignments in the shared cell may be achieved.

According to a second example, UEs that are present in the majority of the sectors (and also broadcast message) are prioritized. That is, according to an embodiment the order of priority is based on the number of transmission points associated with each UE, and UE associated with the most number of transmission points are prioritized. Thereby the cell-edge UEs may be prioritized.

According to a third example, UEs that are prioritized by the system scheduler are prioritized in order to serve the scheduler objectives. That is, according to an embodiment the order of priority is based on objectives of a system scheduler. Examples of scheduler objectives include, but are not limited to, low delay, spectrum efficiency, system throughput, and service fulfillment.

In the following it is assumed that the PDCCH assignment scheme is based on the last objective, i.e. that the PDCCHs are prioritized by the scheduler, using a scheduler weight that is associated to each PDCCH. According to the exemplary PDCCH assignment scheme the following steps are repeated for each sector 8a, 8b, 8c in the cell:

1. Sort the PDCCHs assigned to the sector in a list in scheduler weight order; starting with the PDCCH with highest weight, i.e. highest priority. Only PDCCHs that have not already been assigned in the CCE-space (by another sector assignment) are included in the list;
2. Select the PDCCH with highest weight from the list;
3. Check, with respect to the search space for the PDCCH, if it is possible to assign the PDCCH to the CCE-spaces for all sectors where the corresponding UE is present. With "possible to map" is here referred to the CCEs not being assigned by other PDCCHs, and not reserved by PDCCHs that require muting of CCEs in one or several sectors;
   a. Success: Assign the PDCCH to the selected CCEs in all sectors where the PDCCH is assigned; in case of muting the corresponding CCEs are reserved. The PDCCH is removed from the list; or
   b. Failure: Re-assign the previously assigned PDCCHs to allow the new PDCCH to be allocated;
      i. Success: Assign the PDCCH in all those CCE-spaces and remove the PDCCH from the list; or
      ii. Failure: remove the PDCCH from the list.
4. Go to step 1.

The PDCCH assignment scheme may be repeated either periodically or aperiodically. For example, the PDCCH assignment scheme may be repeated after each complete cycle of PDCCH transmission.

The following is an example of PDCCH weights that could result in the assignments show in FIG. 8. It is assumed that larger weight numbers represent higher priority. There are a number of parameters which may be used to determine the weights. In general terms, broadcast messages are generally given higher weight (i.e. higher priority) than other messages.

TABLE 1

Example of PDCCH resource allocation for UE 4a-j

| PDCCH | #CCEs | Assigned sector | Weight |
|---|---|---|---|
| Broadcast 1 | 4 | All | 100 |
| Broadcast 2 | 8 | All | 90 |
| UE 4a | 2 | 8a | 50 |

TABLE 1-continued

Example of PDCCH resource allocation for UE 4a-j

| PDCCH | #CCEs | Assigned sector | Weight |
|-------|-------|-----------------|--------|
| UE 4b | 4 | 8a | 10 |
| UE 4c | 4 | 8a | 20 |
| UE 4d | 4 | 8b | 30 |
| UE 4e | 2 | 8b | 30 |
| UE 4f | 8 | 8c | 10 |
| UE 4g | 1 | 8c | 60 |
| UE 4h | 4 | 8a, 8b | 40 |
| UE 4i | 1 | 8a, 8b, 8c | 50 |
| UE 4j | 2 | 8c (not 8a) | 80 |

The disclosure has mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of coordinated physical downlink control channel (PDCCH) transmission, comprising:
transmitting, by a first transmission point, first PDCCH control information at a first control channel element (CCE) index to a first user equipment whilst being muted at a second CCE index, wherein said first PDCCH control information is specific for said first user equipment; and
transmitting, by a second transmission point, second PDCCH control information at said second CCE index to a second user equipment whilst being muted at said first CCE index, wherein said second PDCCH control information is specific for said second user equipment, wherein the first transmission point and the second transmission point are associated with a common physical cell identity (PCI) and are controlled by a common network node.

2. The method according to claim 1, further comprising:
transmitting, by a third transmission point, said first PDCCH control information at said first CCE index to said first user equipment,
wherein the first transmission point and the third transmission point are associated with said common PCI and are controlled by said common network node.

3. The method according to claim 1, further comprising:
muting a third transmission point at said first CCE index, wherein the first transmission point and the third transmission point are associated with said common PCI and are controlled by said common network node.

4. The method according to claim 1, wherein one of the first transmission point and the second transmission point is located at the network node.

5. A method of coordinated physical downlink control channel (PDCCH) transmission, comprising:
transmitting, by a first transmission point, first PDCCH control information at a first control channel element (CCE) index to a first user equipment whilst being muted at a second CCE index, wherein said first PDCCH control information is specific for said first user equipment;
transmitting, by a second transmission point, second PDCCH control information at said second CCE index to a second user equipment whilst being muted at said first CCE index, wherein said second PDCCH control information is specific for said second user equipment;
transmitting, by a third transmission point, said first PDCCH control information at said first CCE index to said first user equipment; and
transmitting, by said third transmission point, said second PDCCH control information at said second CCE index to said second user equipment, wherein the first transmission point, the second transmission point, and the third transmission point are associated with a common physical cell identity (PCI) and are controlled by a common network node.

6. The method according to claim 1, wherein reception power of messages received by the first transmission point from the first user equipment and/or reception power of messages received by the first user equipment from the first transmission point is above a first upper threshold, and
wherein reception power of messages received by the second transmission point from the second user equipment and/or reception power of messages received by the second user equipment from the second transmission point is above a second upper threshold.

7. The method according to claim 1,
wherein reception power of messages received by the first transmission point from the second user equipment and/or reception power of messages received by the second user equipment from the first transmission point is below a first lower threshold being lower than the first upper threshold, and
wherein reception power of messages received by the second transmission point from the first user equipment and/or reception power of messages received by the first user equipment from the second transmission point is below a second lower threshold being lower than the second upper threshold.

8. The method according to claim 2, wherein reception power of messages received by the third transmission point from the first user equipment is above a third upper threshold.

9. The method according to claim 1, further comprising:
transmitting, by said first transmission point, broadcast PDCCH control information at a further CCE index to said first user equipment and to said second user equipment.

10. The method according to claim 1, further comprising:
receiving, at the first transmission point and from said network node instructions to transmit said first PDCCH control information; and
receiving, at the second transmission point and from said network node instructions to transmit said second PDCCH control information.

11. The method according to claim 1, wherein the first transmission point is located at a first remote radio unit and the second transmission point is located at a second remote radio unit.

12. A method for coordinated physical downlink control channel (PDCCH) transmission, comprising:
providing a first transmission point with instructions to transmit first PDCCH control information at a first control channel element (CCE) index to a first user equipment whilst being muted at a second CCE index, wherein said first PDCCH control information is specific for said first user equipment; and
providing a second transmission point with instructions to transmit second PDCCH control information at said second CCE index to a second user equipment whilst being muted at said first CCE index, wherein said second PDCCH control information is specific for said second user equipment, wherein the first transmission point and the second transmission point are associated with a common physical cell identity (PCI) and are controlled by a common network node.

13. A method for coordinated physical downlink control channel (PDCCH) transmission, comprising:
providing a first transmission point with instructions to transmit first PDCCH control information at a first control channel element (CCE) index to a first user equipment and to be muted at a second CCE index, wherein said first PDCCH control information is specific for said first user equipment;
providing a second transmission point with instructions to transmit second PDCCH control information at a second CCE index to a second user equipment and to be muted at said first CCE index, wherein said second PDCCH control information is specific for said second user equipment;
providing a third transmission point with instructions to transmit said first PDCCH control information at said first CCE index to said first user equipment; and
providing said third transmission point with instructions to transmit said second PDCCH control information at said second CCE index to said second user equipment,
wherein the first transmission point, the second transmission point, and the third transmission point are associated with a common physical cell identity (PCI) and are controlled by a common network node.

14. The method according to claim 12, further comprising:
acquiring information from each one of the transmission points relating to a number of user equipment associated therewith; and
determining, based on said acquired information, a mapping from a set of PDCCHs to CCE indices, wherein the number of PDCCHs corresponds to the number of unique user equipment, thereby assigning one PDCCH to each user equipment, said instructions being based on said mapping.

15. The method according to claim 14, wherein said determining further is based on an order of priority of the user equipment.

16. The method according to claim 15, wherein said order of priority is based on the number of transmission points associated with each user equipment, and wherein user equipment associated with the least number of transmission points are prioritized.

17. The method according to claim 15, wherein said order of priority is based on the number of transmission points associated with each user equipment, and wherein user equipment associated with the most number of transmission points are prioritized.

18. The method according to claim 15, wherein said order of priority is based on objectives of a system scheduler.

19. The method according to claim 12, wherein the first transmission point and the second transmission point are configured with at least one of: the same transmission bandwidth, the same number of antenna ports, the same physical hybrid automatic repeat request indicator channel, PHICH, configuration, the same control format indicator, CFI, and the same cyclic prefix for modulation.

20. A system for coordinated physical downlink control channel (PDCCH) transmission, the system comprising a first transmission point and a second transmission point, wherein the first transmission point and the second transmission point are associated with a common physical cell identity (PCI) and are controlled by a common network node, and wherein:
the first transmission point is arranged to transmit first PDCCH control information at a first control channel element (CCE) index to a first user equipment whilst being muted at a second CCE index, wherein said first PDCCH control information is specific for said first user equipment; and
the second transmission point is arranged to transmit second PDCCH control information at said second CCE index to a second user equipment whilst being muted at said first CCE index, wherein said second PDCCH control information is specific for said second user equipment.

21. A system for coordinated physical downlink control channel (PDCCH) transmission, the system comprising a first transmission point, a second transmission point, and a third transmission point, wherein the first transmission point, the second transmission point, and the third transmission point are associated with a common physical cell identity (PCI) and are controlled by a common network node, and wherein:
the first transmission point is arranged to transmit first PDCCH control information at a first control channel element (CCE) index to a first user equipment and to be muted at a second CCE index, wherein said first PDCCH control information is specific for said first user equipment;
the second transmission point is arranged to transmit second PDCCH control information at said second CCE index to a second user equipment and to be muted at said first CCE index, wherein said second PDCCH control information is specific for said second user equipment;
the third transmission point is arranged to transmit said first PDCCH control information at said first CCE index to said first user equipment; and
the third transmission point is arranged to transmit said second PDCCH control information at said second CCE index to said second user equipment.

22. A network node for coordinated physical downlink control channel (PDCCH) transmission, comprising a communications interface and a processor in communication with a memory, the processor arranged to:
provide a first transmission point with instructions to transmit first PDCCH control information at a first control channel element (CCE) index to a first user equipment whilst being muted at a second CCE index, wherein said first PDCCH control information is specific for said first user equipment; and
provide a second transmission point with instructions to transmit second PDCCH control information at said second CCE index to a second user equipment whilst being muted at said first CCE index, wherein said second PDCCH control information is specific for said second user equipment,
wherein the first transmission point and the second transmission point are associated with a common physical cell identity (PCI) and are controlled by a common network node.

23. A network node for coordinated physical downlink control channel (PDCCH) transmission, comprising a communications interface and a processor in communication with a memory, the processor arranged to:
provide a first transmission point with instructions to transmit first PDCCH control information at a first control channel element (CCE) index to a first user equipment and to be muted at a second CCE index, wherein said first PDCCH control information is specific for said first user equipment;

provide a second transmission point with instructions to transmit second PDCCH control information at a second CCE index to a second user equipment and to be muted at said first CCE index, wherein said second PDCCH control information is specific for said second user equipment;

provide a third transmission point with instructions to transmit said first PDCCH control information at said first CCE index to said first user equipment; and provide said third transmission point with instructions to transmit said second PDCCH control information at said second CCE index to said second user equipment, wherein the first transmission point, the second transmission point, and the third transmission point are associated with a common physical cell identity (PCI) and are controlled by a common network node.

24. A non-transitory computer readable media comprising computer program code for performing coordinated physical downlink control channel (PDCCH) transmission, wherein execution of the computer program code on one or more processing units of each of a first transmission point and a second transmission point, causes the first transmission point and the second transmission point to:

transmit, by the first transmission point, first PDCCH control information at a first control channel element (CCE) index to a first user equipment whilst being muted at a second CCE index, wherein said first PDCCH control information is specific for said first user equipment; and transmit, by the second transmission point, second PDCCH control information at said second CCE index to a second user equipment whilst being muted at said first CCE index, wherein said second PDCCH control information is specific for said second user equipment, wherein the first transmission point and the second transmission point are associated with a common physical cell identity (PCI) and are controlled by a common network node.

25. A non-transitory computer readable media comprising computer program code for performing coordinated physical downlink control channel (PDCCH) transmission, wherein execution of the computer program code on one or more processing units of each of a first transmission point, a second transmission point and a third transmission point, causes the first transmission point, the second transmission point and the third transmission point to:

transmit, by the first transmission point, first PDCCH control information at a first control channel element (CCE) index to a first user equipment and to be muted at a second CCE index, wherein said first PDCCH control information is specific for said first user equipment;

transmit, by the second transmission point, second PDCCH control information at said second CCE index to a second user equipment and to be muted at said first CCE index, wherein said second PDCCH control information is specific for said second user equipment;

transmit, by the third transmission point, said first PDCCH control information at said first CCE index to said first user equipment; and transmit, by the third transmission point, said second PDCCH control information at said second CCE index to said second user equipment, wherein the first transmission point, the second transmission point, and the third transmission point are associated with a common physical cell identity (PCI) and are controlled by a common network node.

26. A non-transitory computer readable media comprising computer program code for performing coordinated physical downlink control channel (PDCCH) transmission, wherein execution of the computer program code on one or more processing units of a network node, causes the network node to:

provide a first transmission point with instructions to transmit first PDCCH control information at a first control channel element (CCE) index to a first user equipment whilst being muted at a second CCE index, wherein said first PDCCH control information is specific for said first user equipment; and provide a second transmission point with instructions to transmit second PDCCH control information at said second CCE index to a second user equipment whilst being muted at said first CCE index, wherein said second PDCCH control information is specific for said second user equipment, wherein the first transmission point and the second transmission point are associated with a common physical cell identity (PCI) and are controlled by a common network node.

27. A non-transitory computer readable media comprising computer program code for performing coordinated physical downlink control channel (PDCCH) transmission, wherein execution of the computer program code on one or more processing units of a network node, causes the network node to:

provide a first transmission point with instructions to transmit first PDCCH control information at a first control channel element (CCE) index to a first user equipment and to be muted at a second CCE index, wherein said first PDCCH control information is specific for said first user equipment;

provide a second transmission point with instructions to transmit second PDCCH control information at a second CCE index to a second user equipment and to be muted at said first CCE index, wherein said second PDCCH control information is specific for said second user equipment;

provide a third transmission point with instructions to transmit said first PDCCH control information at said first CCE index to said first user equipment; and provide said third transmission point with instructions to transmit said second PDCCH control information at said second CCE index to said second user equipment, wherein the first transmission point, the second transmission point, and the third transmission point are associated with a common physical cell identity (PCI) and are controlled by a common network node.

* * * * *